US012654296B2

(12) United States Patent
Chen et al.

(10) Patent No.: US 12,654,296 B2
(45) Date of Patent: Jun. 16, 2026

(54) PULLER

(71) Applicants: Yi-Fang Chen, Taichung (TW); Wei-Li Chen, Taichung (TW)

(72) Inventors: Yi-Fang Chen, Taichung (TW); Wei-Li Chen, Taichung (TW)

( * ) Notice: Subject to any disclaimer, the term of this patent is extended or adjusted under 35 U.S.C. 154(b) by 0 days.

(21) Appl. No.: 17/213,216

(22) Filed: Mar. 26, 2021

(65) Prior Publication Data

US 2022/0152800 A1 May 19, 2022

(30) Foreign Application Priority Data

Nov. 18, 2020 (TW) ................................ 109140257

(51) Int. Cl.
*B25B 27/06* (2006.01)

(52) U.S. Cl.
CPC .......... *B25B 27/064* (2013.01); *B25B 27/062* (2013.01)

(58) Field of Classification Search
CPC . B25B 27/023; B25B 27/026; B25B 27/0035; B25B 27/06; B25B 27/062; B25B 27/064
USPC ........ 29/426.5, 426.1, 213.1, 215, 239, 244, 29/256–266
See application file for complete search history.

(56) References Cited

U.S. PATENT DOCUMENTS

| | | | | |
|---|---|---|---|---|
| 5,419,027 A * | 5/1995 | McPeak | B25B 27/023 | 29/261 |
| 5,557,833 A * | 9/1996 | Pool | B25B 27/023 | 29/261 |
| 6,895,646 B1 * | 5/2005 | Houg | B25B 27/026 | 29/261 |
| 9,216,499 B2 * | 12/2015 | Huang | B25B 27/062 | |
| 10,894,306 B2 * | 1/2021 | Wang | B25B 27/062 | |
| 2013/0152353 A1 * | 6/2013 | Hu | B25B 27/023 | 29/256 |
| 2020/0108492 A1 * | 4/2020 | Hu | B25B 27/062 | |

FOREIGN PATENT DOCUMENTS

EP 2241406 A2 * 10/2020 ........... B25B 27/023

* cited by examiner

*Primary Examiner* — Robert F Neibaur
(74) *Attorney, Agent, or Firm* — Che-Yang Chen

(57) ABSTRACT

A puller includes a collar, claws, a synchronizer and an abutting assembly. The collar includes slots and pivotal connectors located corresponding to the slots. The claws are pivotally connected to the pivotal connectors. Each of the claws includes a protuberance movable in a corresponding one of the slots. The synchronizer includes a receiving portion for receiving the protuberances. The synchronizer is movable in the collar between an opening position and a closing position. In the opening position, the synchronizer opens the claws by the protuberances. In the closing position, the synchronizer closes the claws by the protuberances. The synchronizer is extensible from the collar.

16 Claims, 11 Drawing Sheets

PULLER

BACKGROUND OF INVENTION

1. Field of Invention

The present invention relates to a puller and, more particularly, to a simple, efficient, safe and easy-to-use puller.

2. Related Prior Art

Various annular elements such as bearings, gears and pulleys are used on various axles. To remove an annular element from an axle, pullers are used. A conventional puller includes two claws pivotally connected to a collar. An abutting element such as threaded rod or a hydraulic device is inserted in the collar. In use, the claws are engaged with the annular element. Then, the abutting element is operated to abut an end thereof against an end of the axle. The operation of the abutting element is continued to move the collar and the claws away from the axle. Thus, the annular element is detached from the axle. However, the claws are not interconnected so that each of the claws is engaged with or disengaged from a portion of the annular element independent of the other claw. Attention has to be paid to the engagement of each of the claws with the corresponding portion of the annular element because the former might be disengaged from the latter accidentally. Such accidental disengagement is hazardous for a user of the puller.

The threaded rod provides a long stroke for moving the annular element. However, the rotation of the threaded rod relative to the collar to extend the threaded rod from the collar to abut against the axle is inefficient. The extension of a piston rod from the hydraulic device is fast. However, the stroke of the extension of the piston rod is short. Hence, the operation of detaching the annular element from the axle often includes several phases. In an initial phase, the puller alone is used to move the annular element along the axle for a stroke. In a following phase, the claws are disengaged from the annular element before an extensive element is connected to the piston rod. Then, the puller is used to move the annular element along the axle for another stroke. The following phase is repeated until the annular element is detached from the axle.

The present invention is therefore intended to obviate or at least alleviate the problems encountered in the prior art.

SUMMARY OF INVENTION

It is an objective of the present invention to provide a simple, efficient and convenient puller.

To achieve the foregoing objective, the puller includes a collar, claws, a synchronizer and an abutting assembly. The collar includes a space, a screw hole in communication with the space, slots in communication with the space, and pivotal connectors located corresponding to the slots. The claws are pivotally connected to the pivotal connectors. Each of the claws includes a protuberance movable in a corresponding one of the slots. The synchronizer is movably inserted in the space of the collar. The synchronizer includes a receiving portion for receiving the protuberances. The abutting assembly is inserted in the screw hole of the collar.

It is another objective of the present invention to provide a puller with a long stroke of operation.

To achieve the foregoing objective, the puller includes a collar, claws, a synchronizer, an abutting assembly and an extensive element. The collar includes a space, a screw hole in communication with the space, slots in communication with the space, and pivotal connectors located corresponding to the slots. The claws are pivotally connected to the pivotal connectors. Each of the claws includes a protuberance movable in a corresponding one of the slots. The synchronizer includes a receiving portion for receiving the protuberances. The synchronizer is movable in the collar between an opening position and a closing position. In the opening position, the synchronizer opens the claws by the protuberances. In the closing position, the synchronizer closes the claws by the protuberances. The synchronizer includes a receiving portion for receiving the protuberances. The abutting assembly is extensible from the collar.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
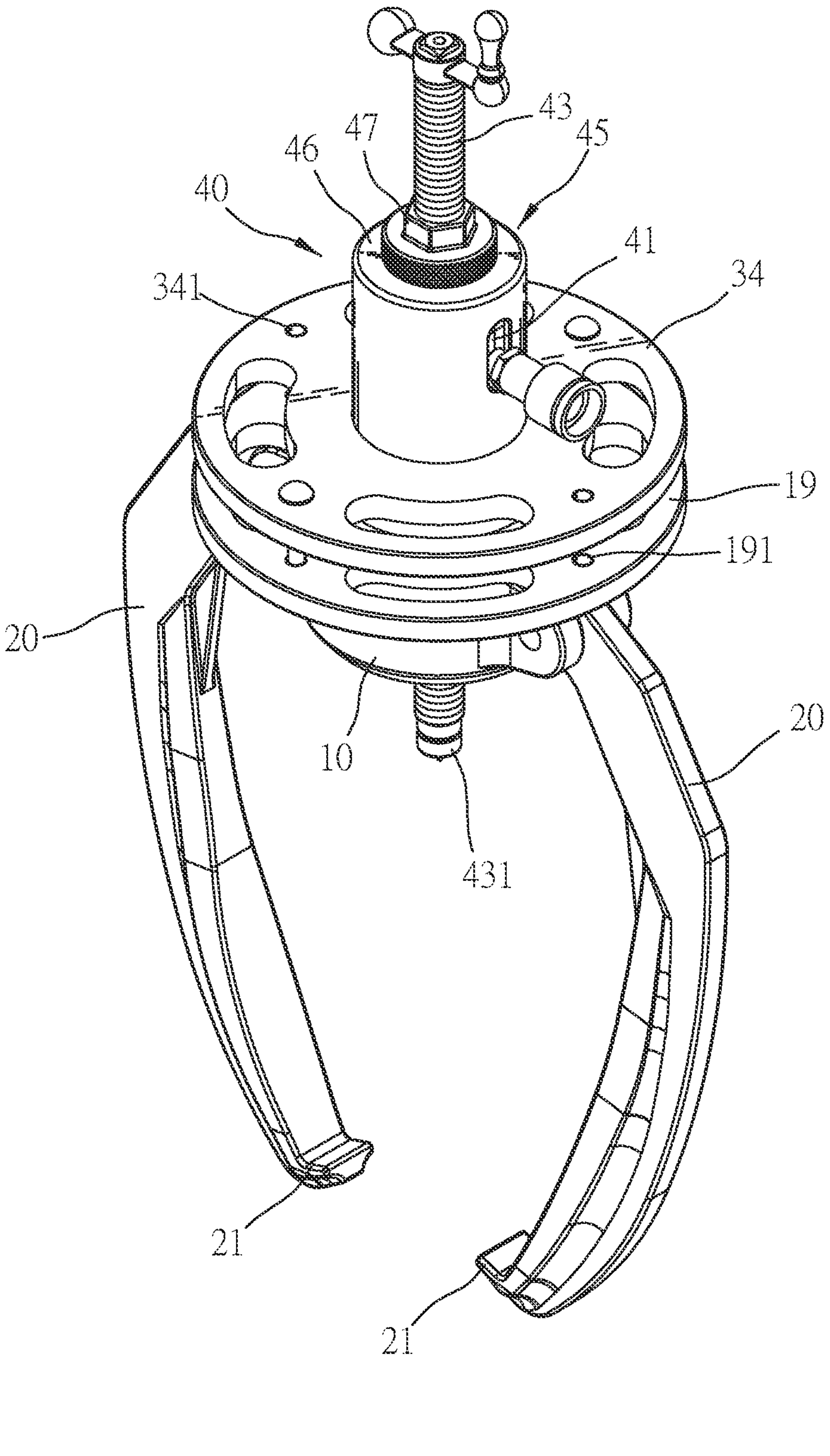
FIG. 1 is a perspective view of a puller according to the first embodiment of the present invention.
Figure 2:
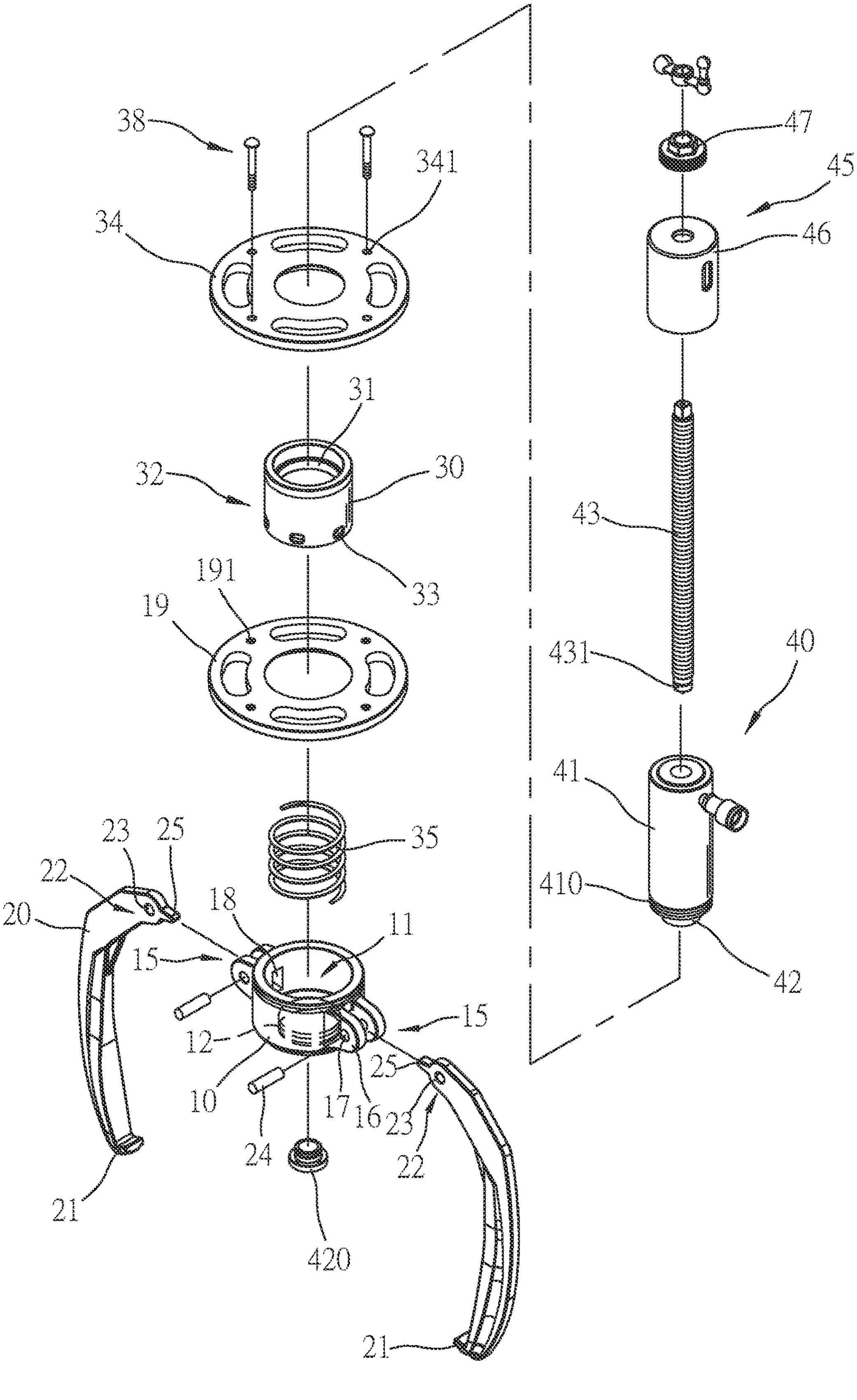
FIG. 2 is an exploded view of the puller shown in FIG. 1.
Figure 3:
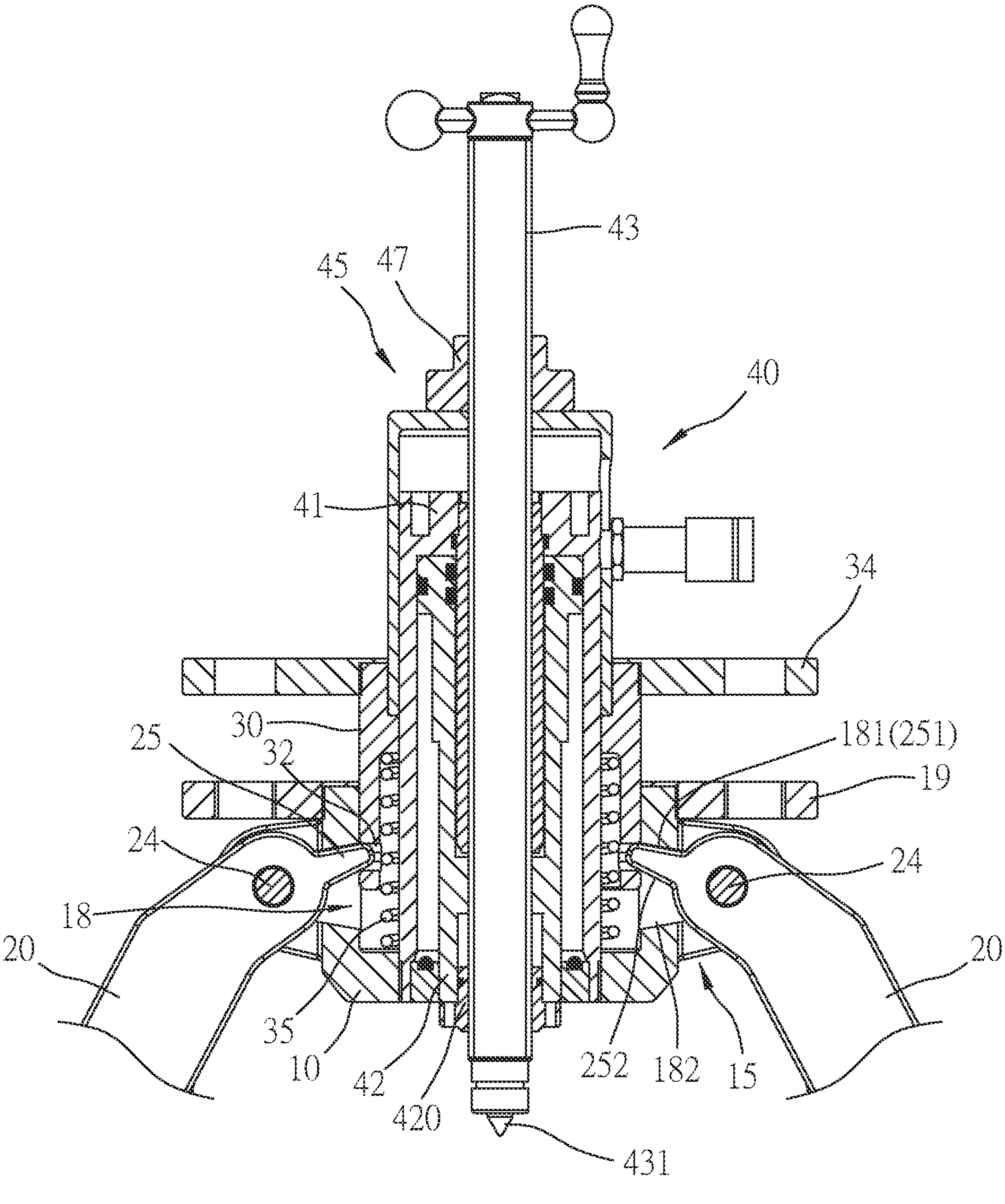
FIG. 3 is an enlarged, partial and cross-sectional view of the puller shown in FIG. 1.
Figure 6:
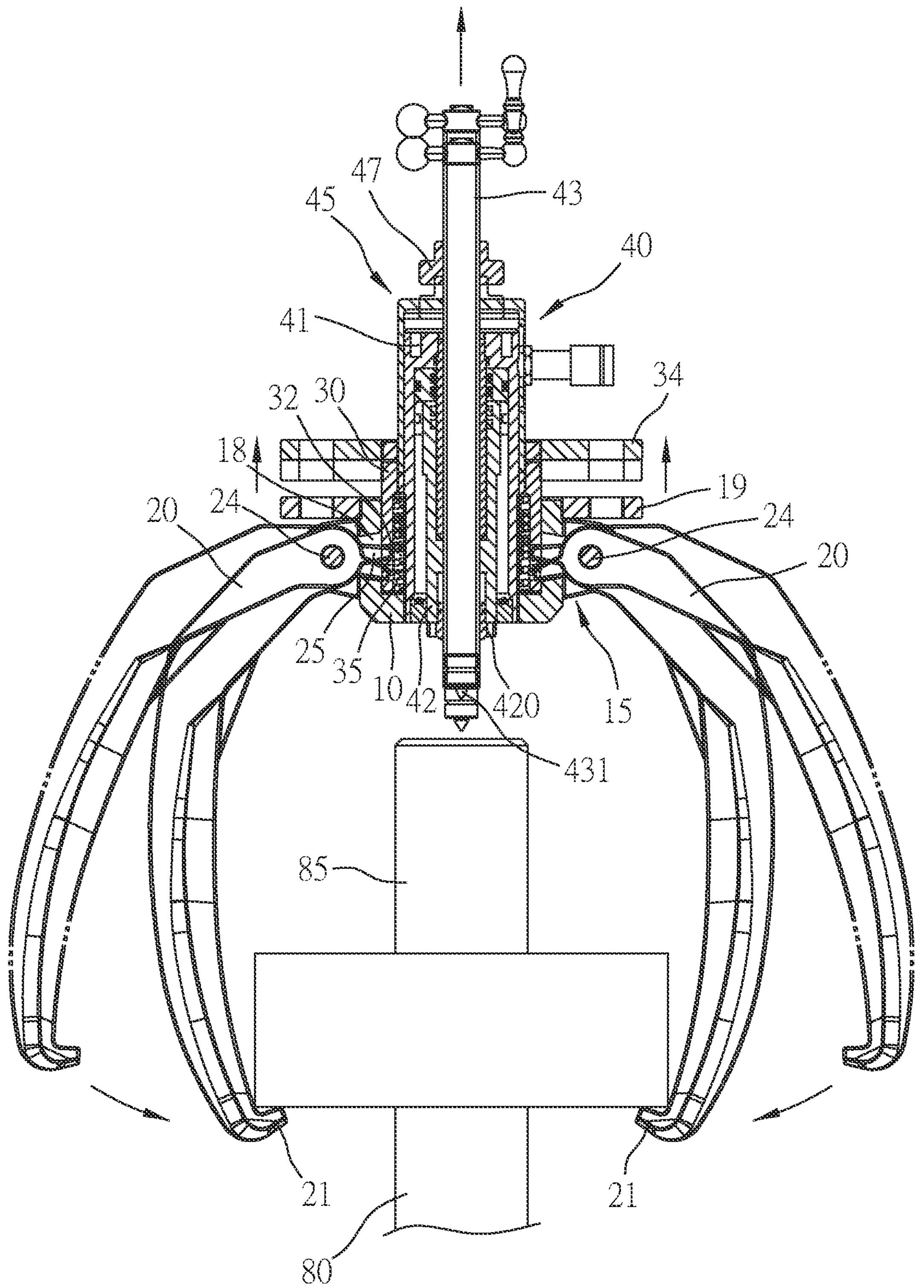
FIG. 6 is a cross-sectional view of the puller shown in FIG. 1 used to detach an annular element from an axle.
Figure 7:
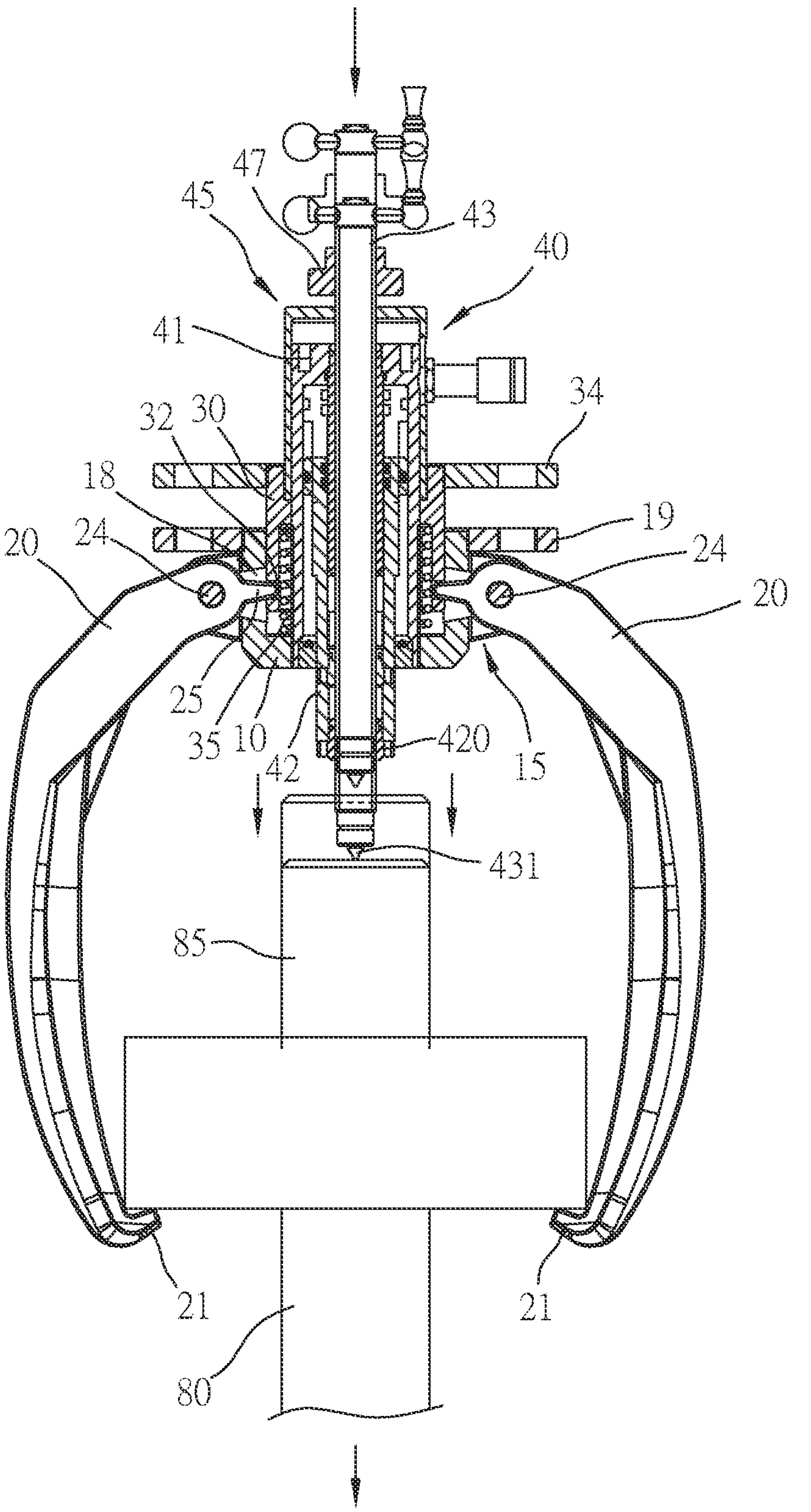
FIG. 7 is a cross-sectional view of the puller, the annular element and the axle in another position than shown in FIG. 6.

Referring to FIGS. 1 through 3, a collar 10, two claws 20, a synchronizer 30, an abutting assembly 40 and a restraint assembly 45 in accordance with a first embodiment of the present invention. The claws 20 are pivotally connected to the collar 10. The synchronizer 30 is used to synchronize the pivoting of the claws 20 to claw an annular element 80 to be detached from an axle 85 (FIG. 6). The abutting assembly 40 is inserted in and engaged with the collar 10. The abutting assembly 40 is movable relative to the collar 10 to detach the annular element 80 from the axle 85 (FIGS. 6 and 7).

The collar 10 is formed with a space 11, a screw hole 12 in communication with the space 11, and two slots 18 in communication with the space 11. The combination of the space 11 with the screw hole 12 axially extends throughout the collar 10. The abutting assembly 40 is inserted in the screw hole 12. The collar 10 further includes two opposite pivotal connectors 15. Each of the pivotal connectors 15 includes two lugs 16 each of which includes an aperture 17. Each of the slots 18 is located between the lugs 16 of a corresponding one of the pivotal connectors 15. Each of the slots 18 includes a closing limit 181 and an opening limit 182. The limits 181 and 182 of each of the slots 18 are used to limit the range of the pivoting of a corresponding one of the claws 20.

The puller further includes two discs 19 and 34. The disc 19 includes several screw holes 191. The disc 34 includes orifices 341 corresponding to the screw holes 191.

Each of the claws 20 includes a barb 21 at a lower end, a protuberance 25 at an upper end, and a pivotally connective portion 22 in the vicinity of the barb 21. The barb 21 of each of the claws 20 is used for engagement with a portion of the annular element 80 (FIGS. 6 and 7). The pivotally connective portion 22 of each of the claws 20 is formed with an aperture 23.

In assembly, the protuberance 25 of each of the claws 20 is movably inserted in a corresponding one of the slots 18 so that the upper end of each of the claws 20 is located between the lugs 16 of a corresponding one of the pivotal connectors 15. A pivot 24 is fitted in the apertures 17 of the lugs 16 of each of the pivotal connectors 15 and the aperture 23 of a corresponding one of the claws 20. Thus, the pivotally connective portion 22 of each of the claws 20 is pivotally connected to a corresponding one of the pivotal connectors 15 of the collar 10. Each of the pivots 24 can be a pin, a rivet or a combination of a threaded bolt with a nut.

As mentioned above, the protuberances 25 of the claws 20 are movably inserted in the slots 18 of the collar 10. Thus, the protuberances 25 are moved in the slots 18 as the claws 20 are pivoted relative to the collar 10. Each of the protuberances 25 includes a closing limit 251 on an upper face and an opening limit 252 on a lower face. The closing limits 251 of the protuberances 25 are in contact with the closing limits 181 of the slots 18 to limit the closing of the claws 20. The closing limits 252 of the protuberances 25 are in contact with the opening limit 182 of the slots 18 to limit the opening of the claws 20. The limits 181 and 182 of each of the slots 18 extend away from each other as they extend to an internal face of the collar 10 from an external face of the collar to enlarge the angle of the pivoting of a corresponding one of the claws 20.

The synchronizer 30 is preferably a collar formed with an internal flange 31 at an upper end and a receiving portion 32 at a lower end. The receiving portion 32 of the synchronizer 30 includes several bores 33. The bores 33 can be made in an external face of the synchronizer 30 only or throughout the synchronizer 30 in a radial direction.

In assembly, the synchronizer 30 is movably inserted in the space 11 of the collar 10. A spring 35 is compressed between the synchronizer 30 and the collar 10 so that the spring 35 tends move the synchronizer 30 away from the collar 10. The spring 35 includes an end in contact with the internal flange 31 of the synchronizer 30 and an internal flange of the collar 10 formed around the screw hole 12. The spring 35 is hidden in the synchronizer 30 in consideration of aesthetics of the puller and safety of a user.

The protuberance 25 of each of the claws 20 is inserted in a corresponding one of the bores 33 of the synchronizer 30. Thus, the synchronizer 30 is moved relative to the collar 10 to synchronously pivot the claws 20 relative to the collar 10. To keep the protuberances 25 in the corresponding one of the bores 33, the protuberances 25 are made with an adequate length and strength.

The disc 19 is attached to the collar 10 so that they are not movable relative to each other. To this end, the disc 19 is formed with a cavity (not numbered) in which an upper end of the collar 10 is fitted.

The disc 34 is attached to the synchronizer 30 so that they are not movable relative to each other. To this end, the disc 34 is formed with a cavity (not numbered) in which the upper end of the synchronizer 30 is fitted.

A screw 38 is inserted in each of the screw holes 191 of the disc 19 through a corresponding one of the orifices 341 of the disc 34. Thus, the discs 19 and 34 are movably connected to each other.

The screw holes 191 can be replaced with orifices like the orifices 341 in an alternative embodiment. A nut (not shown) is used with each of the screws 38 in such an alternative embodiment.

The abutting assembly 40 includes a hydraulic or pneumatic device and a threaded rod 43. A hydraulic device such as PH202 made by SPX is preferred. The hydraulic device includes a cylinder 41 and a piston tube 42. The cylinder 41 extends axially throughout the discs 19 and 34, the synchronizer 30, the spring 35 and the collar 10. The cylinder 41 includes a threaded section 410 inserted in the screw hole 12. The piston tube 42 is extensible from the cylinder 41 as hydraulic pressure in the cylinder 41 is increased by a manual, electric or pneumatic pump.

A ring 420 is inserted in a lower open end (not numbered) of the piston tube 42. The threaded rod 43 extends throughout the ring 420 and the piston tube 42 axially. The threaded rod 43 is rotatable and hence translatable relative to the piston tube 42. To this end, a thread can be made on an internal face of the piston tube 42. Preferably, a sleeve (not numbered) is fitted in the piston tube 42 so that the former is not rotatable relative to the latter. A lower end of the sleeve is abutted against an internal flange (not numbered) of the piston tube 42. An internal face of the sleeve is formed with a thread (not numbered) engaged with the threaded rod 43.

The threaded rod 43 can be replaced with a second hydraulic device in another embodiment. The second hydraulic device includes the piston tube 42 as a cylinder. The second hydraulic device further includes a piston rod extensible from the piston tube 42 when hydraulic pressure in the piston tube 42 is increased.

The restraint assembly 45 includes a cap 46 and a restraint 47. The cap 46 covers the cylinder 41. A lower section of the cap 46 is inserted in the synchronizer 30 so that a lower end of the cap 46 is abutted against an annular flange (not numbered) of the synchronizer 30. Preferably, the restraint 47 is a nut engaged with the threaded rod 43.

Referring to FIG. 3, in an idle position, the threaded rod 43 is retreated into the piston tube 42. The hydraulic pressure in the cylinder 41 is reduced to allow the piston tube 42 to be retreated into the cylinder 41.

The spring 35 keeps the synchronizer 30 in an upper position relative to the collar 10. The synchronizer 30 keeps the protuberances 25 of the claws 20 in an upper position relative to the collar 10 so that the claws 20 are pivoted toward the abutting assembly 40 about the pivots 24, i.e., closed. The closing limit 251 of the protuberance 25 of each of the claws 20 is in contact with the closing limit 181 of each of the slots 18 of the collar 10 so that the angle between each of the claws 20 and the abutting assembly 40 is at a smallest value. Moreover, the protuberances 25 keep a lower section of the synchronizer 30 in the collar 10, thereby keeping the spring 35 in position.

The restraint 47 abuts against the cap 46. The cap 46 in turn abuts stops the synchronizer 30. The synchronizer 30 in turn keeps the spring 35 in the collar 10.

Figure 5:
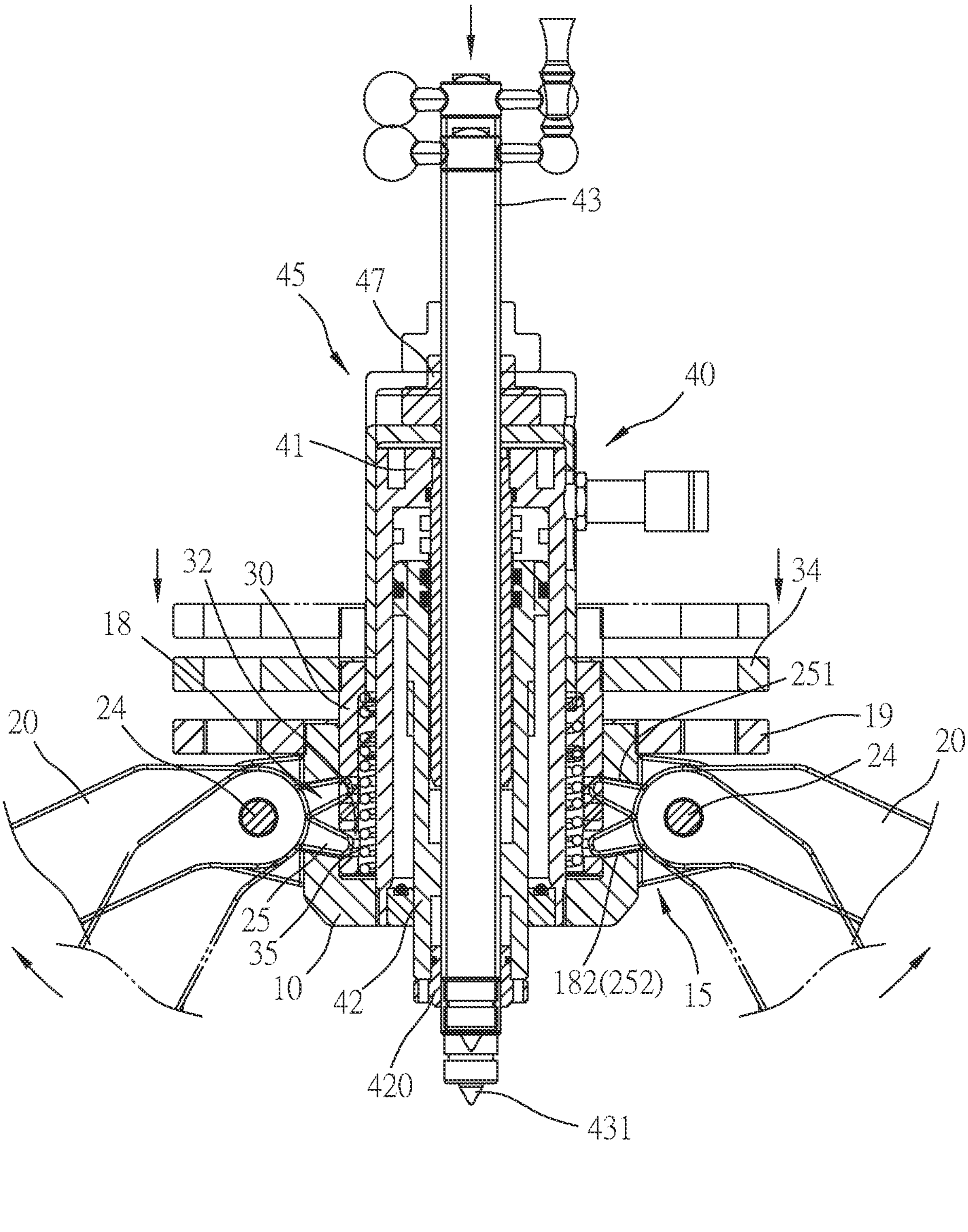
FIG. 5 is an enlarged, partial and cross-sectional view of the puller in another position than shown in FIG. 3.

Referring to FIG. 5, to detach the annular element 80 from the axle 85, the claws 25 are opened at first. To this end, the hydraulic pressure in the cylinder 41 is increased to extend the piston tube 42 and the threaded rod 43 from the cylinder 41, i.e., downwards as shown in FIG. 5. The restraint 47, which is attached to the threaded rod 43, moves the cap 46 downwards. The cap 46 abuts against the internal flange of the synchronizer 30 to move the synchronizer 30 downwards relative to the collar 10. Accordingly, the protuberances 25 of the claws 20 are moved toward the opening limits 182 of the slots 18 of the collar 10, thereby pivoting the claws 25 away from the abutting assembly 40, i.e., opened. The spring 35 is compressed as the synchronizer 30 is moved toward the collar 10.

Should the hydraulic device fail, the disc 34 could be moved toward the disc 19 to move the synchronizer 30 toward the collar 10.

Referring to FIG. 6, the claws 20 are located around the annular element 85. The hydraulic pressure in the cylinder 41 is reduced retreat the piston tube 42 and the threaded rod 43 into the cylinder 41. The restraint 47 releases the cap 46. The cap 46 releases the synchronizer 30 to allow the spring 35 to move the synchronizer 30 away from the collar 10. Thus, the protuberances 25 of the claws 20 are moved toward the closing limits 181 of the slots 18 of the collar 10. Hence, the claws 20 are pivoted toward the abutting assembly 40, i.e., closed, so that the barbs 21 of the claws 20 are engaged with lower portions of the annular element 80. Now, a tip 431 of the threaded rod 43 is located above an upper end of the axle 85.

Referring to FIG. 7, the restraint 47 is moved upwards along the threaded rod 43, i.e., away from the cap 46 so that the restraint 47 cannot move the cap 46 downwards when the threaded rod 43 is rotated and hence extended from the piston tube 42. The tip 431 of the threaded rod 43 is abutted against the upper end of the axle 85. The hydraulic pressure in the cylinder 41 is increased to extend the piston tube 42 and the threaded rod 43 from the cylinder 41 to move the collar 10 and the claws 20 away from the axle 85. The claws 20 move the annular element 80 upwards relative to the axle 85 because the barbs 21 of the claws 20 are engaged with the lower portions of the annular element 80. Eventually, the annular element 80 is detached from the axle 85.

Figure 11:
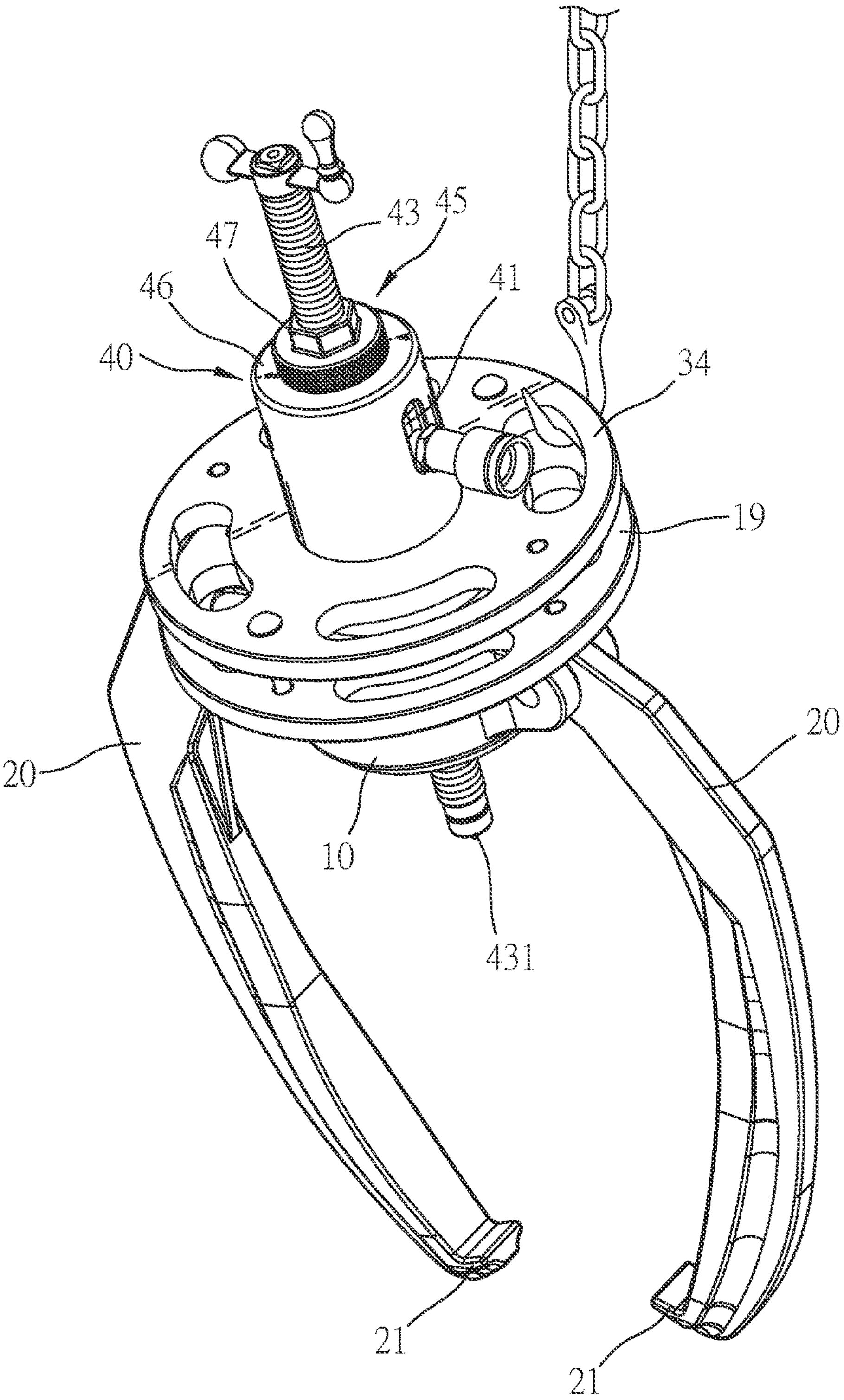
FIG. 11 is a perspective view of the puller shown in FIG. 1 hung on a chain by a hook.

The puller can be used with a crane (not shown) so that the crane can be used to lift the annular element 80 after the annular element 80 is detached from the axle 85. To this end, referring to FIG. 4, two rings (not numbered) are attached to the disc 34, and the rings are hooked by two hooks (not numbered) tied to two chains (not numbered) which are in turn tied to the crane. Alternatively, referring to FIG. 11, the disc 34 is formed with at least one arched slot (not numbered), thereby forming a lug-like portion (not numbered) along the arched slot, and the lug-like portion is hooked by a hook tied to a chain which is in turn tied to the crane.

Figure 8:
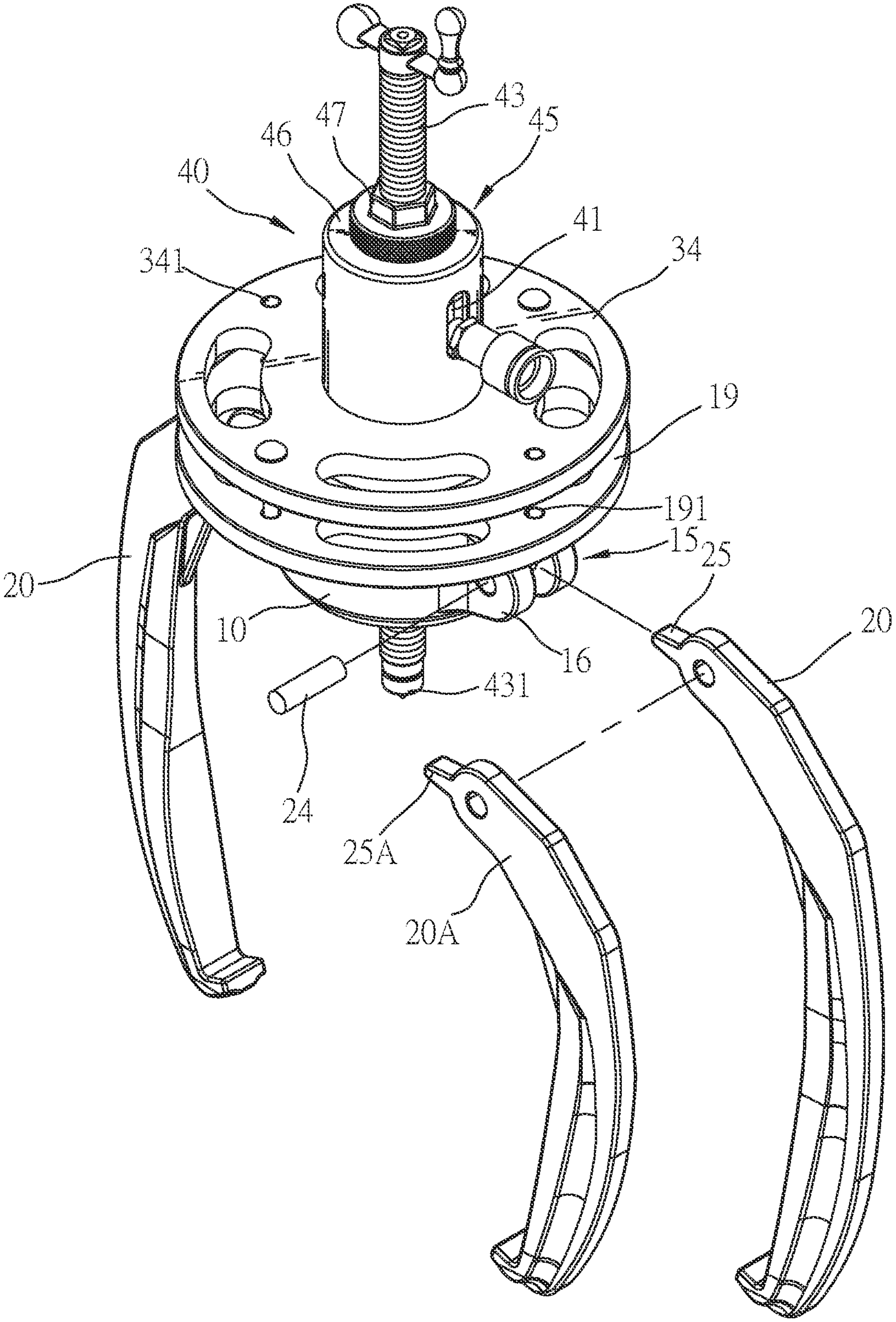
FIG. 8 is a perspective view of the puller shown in FIG. 2, with a claw to be replaced with another claw.

Referring to FIG. 8, each of the claws 20 can be replaced with a claw 20A of another size. The claw 20A is otherwise identical to the claws 20. To this end, each of the pivots 24 is detached from a corresponding one of the pivotal connectors 15 and the pivotally connective portions 22 of a corresponding one of the claws 20 to allow a corresponding one of the claws 20 to be detached from a corresponding one of the pivotal connectors 15 of the collar 10. Then, the claws 20A are connected to the pivotal connectors 15 of the collar 10 by the pivots 24.

Figure 4:
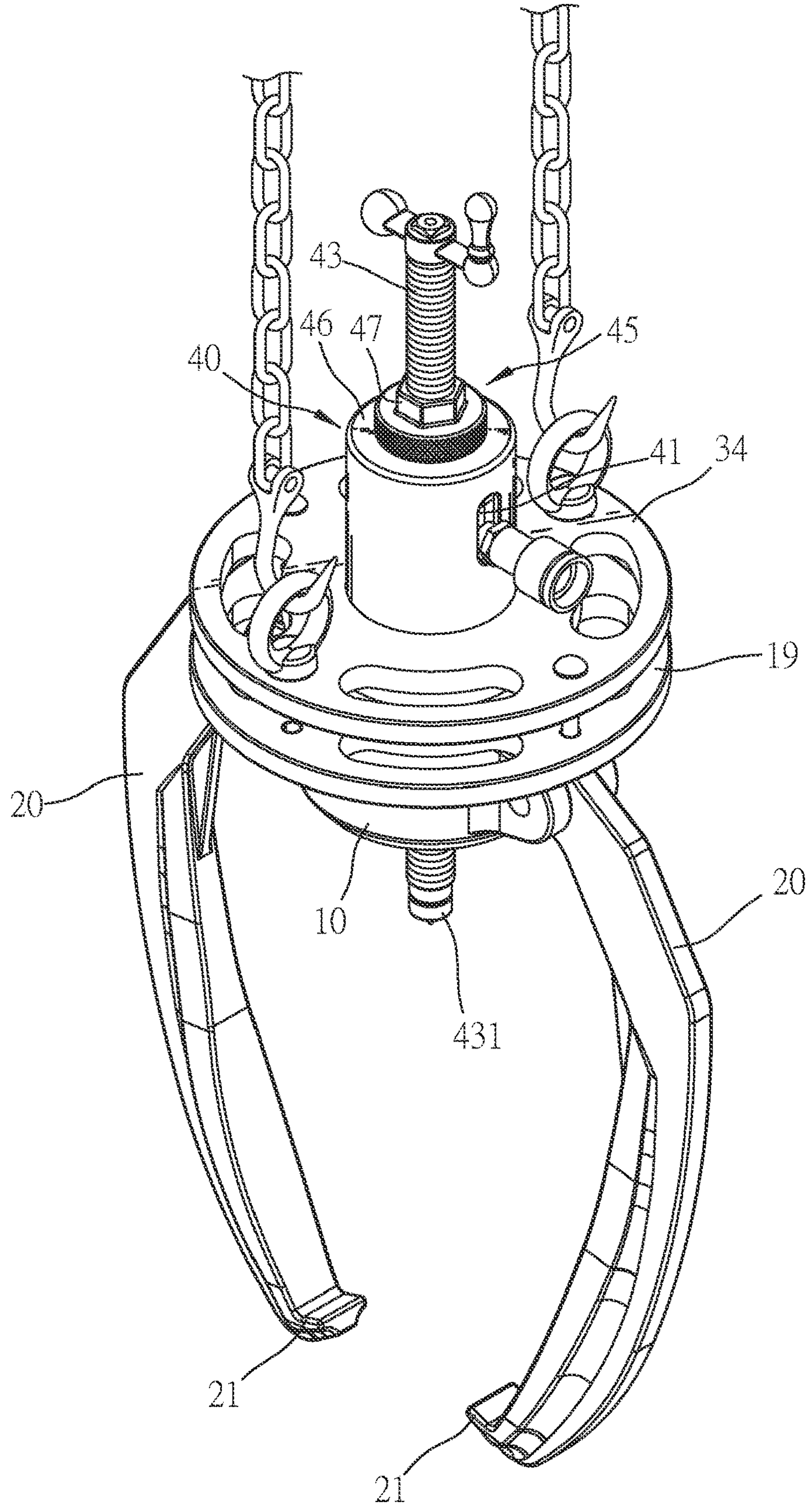
FIG. 4 is a perspective view of the puller shown in FIG. 1 hung on two chains by two hooks.

During the replacement of the claws 20 with the claws 20A, the screws 38 avoid detachment of the disc 34 from the disc 19. The disc 34 presses the upper end of the synchronizer 30 to keep the lower end of the synchronizer 30 in the collar 10, thereby keeping the spring 35 in position (FIG. 4). Moreover, each of the slots 18 is kept in communication with a corresponding one of the bores 33 to facilitate the insertion of the protuberance 25 of a corresponding one of the claws 20A (or the claws 20) into each of the slots 18 via a corresponding one of the bores 33.

Figure 9:
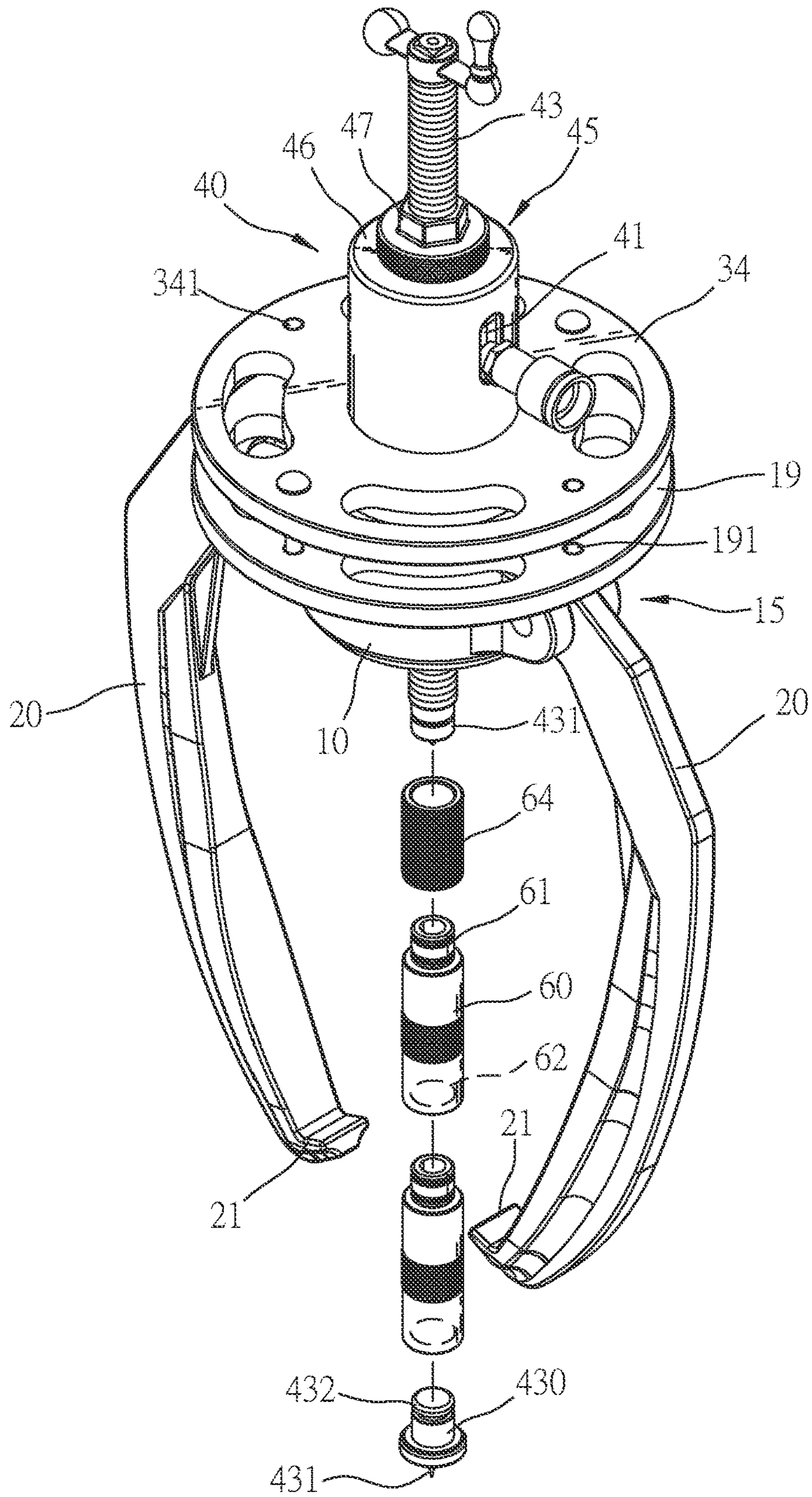
FIG. 9 is a perspective view of the puller shown in FIG. 2, used with two extensive elements.

Referring to FIG. 9, the abutting assembly 40 is used with an end element 430, two extensive elements 60 and a sleeve 64 for example when the abutting assembly 40 is not long enough to detach the annular element 80 from the axle 85. The end element 430 includes a tip 431 at a lower end and an insert 432 at an upper end. Each of the extensive elements 60 includes an insert 61 at an upper end and a cavity 62 in a lower end. An upper open end of the sleeve 64 receives the tip 431 of the threaded rod 43, and a lower open end of the sleeve 64 receives the insert 61 of an upper one of the extensive elements 60. The insert 61 of a lower one of the extensive elements 60 is inserted in the cavity 62 of the upper extensive element 60, and the cavity 62 of the lower extensive element 60 receives the insert 432 of the end element 430. The tip 431 of the end element 430 is used for abutment against the upper end of the axle 85 in operation.

Preferably, the insert 61 of each of the extensive elements 60 is formed with an annular groove (not numbered) for receiving an elastic ring (not shown) or a bore (not shown) for receiving a spring-biased ball (not shown). The elastic ring or spring-biased ball is used to keep the insert 61 in the corresponding open end or cavity 62.

Similarly, the insert 432 of the end element 430 is formed with an annular groove (not numbered) for receiving an elastic ring (not shown) or a bore (not shown) for receiving a spring-biased ball (not shown) to keep the insert 432 of the end element 430 in the cavity 62 of the lower extensive element 60.

Figure 10:
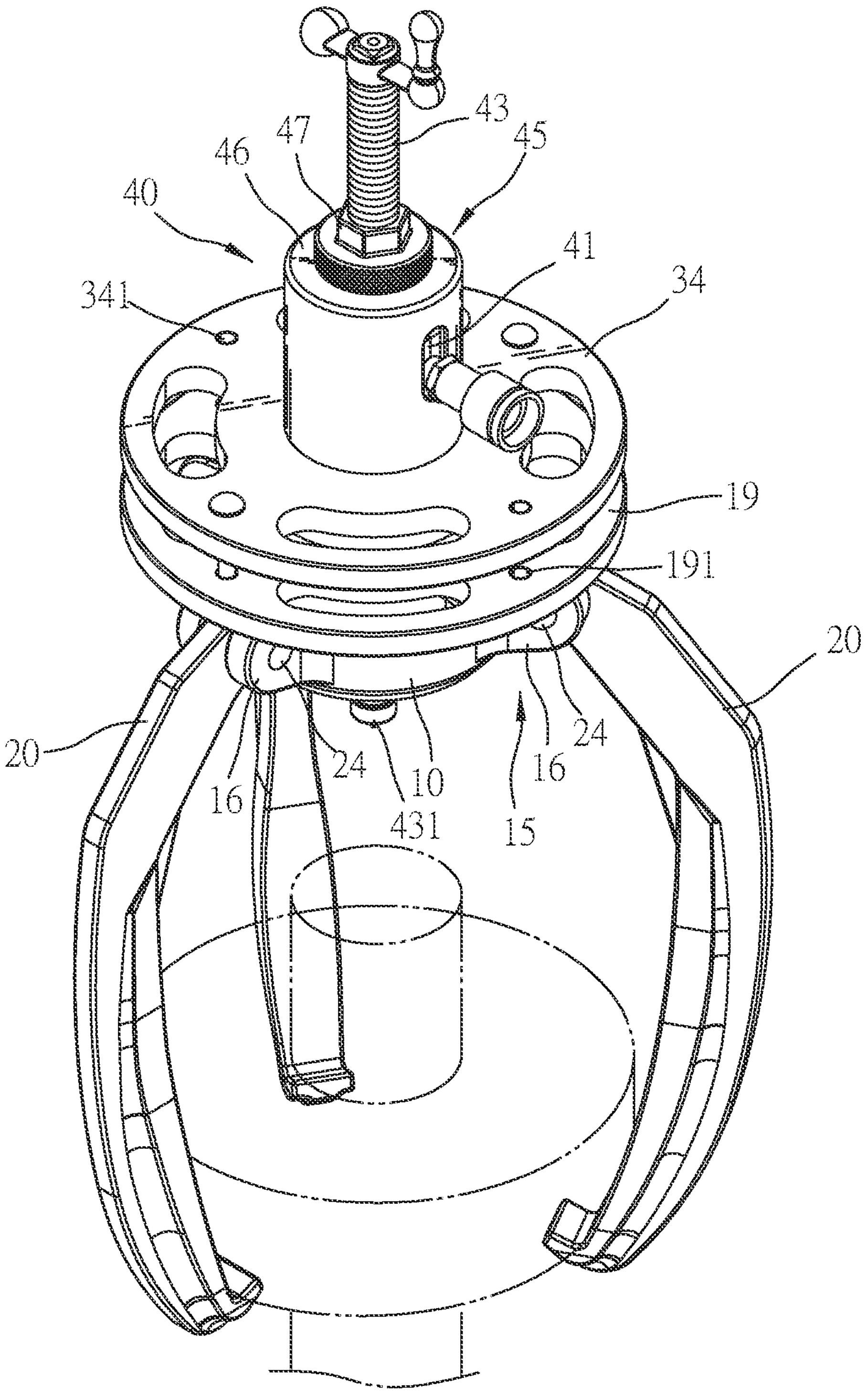
FIG. 10 is a perspective view of a puller according to the second embodiment of the present invention.

Referring to FIG. 10, shown is a puller according to a second embodiment of the present invention. The second embodiment is identical to the first embodiment except for including three claws 20 connected to three pivotal connectors 15 of the claws 20.

As described above, the synchronizer 30, which is movable relative to the collar 10, is used to synchronize the pivoting of the claws 20, which are pivotally connected to the collar 10, toward or away from the annular element 80. Hence, the puller is simple in structure.

Furthermore, between the claws 20, there is only the abutting assembly 40 used to abut against the upper end of the axle 85. Hence, there is nothing to interfere with the pivoting of the claws 20 or replacement of any of the claws 20 with another claw.

Moreover, the protuberance 25 of the claws 20 are inserted in the slots 18 of the collar 10 and some of the bores 33 of the synchronizer 30, thereby keeping the lower section of the synchronizer 30 in the collar 10 in operation. During the replacement of any of the claws 20 with another claw, the screws 38 keep the discs 19 and 34 to each other to keep the lower section of the synchronizer 30 in the collar 10, without having to use any other element. This also simplifies the structure of the puller. The easy replacement of any of the claws 20 with a claw 20A of another size saves the user from purchasing and keeping pullers of various sizes which would otherwise be expensive and inconvenient.

Thirdly, the diverging gap between the limits 181 and 182 of each of the slots 18 allows a large range of the pivoting of a corresponding one of the claws 20. However, the limits 181 and 182 of the slots 18 keep the pivoting of the claws 20 to a reasonably large range.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A puller comprising:

a collar comprising slots and pivotal connectors located corresponding to the slots;

claws pivotally connected to the pivotal connectors, wherein each of the claws comprises a protuberance movable in a corresponding one of the slots;

a synchronizer comprising a receiving portion for receiving the protuberances, wherein the synchronizer is movable in the collar between an opening position and a closing position, wherein the synchronizer opens the claws by the protuberances in the opening position, wherein the synchronizer closes the claws by the protuberances in the closing position;

an abutting assembly inserted in and engaged with the collar for causing the synchronizer to move, wherein the abutting assembly comprises a cylinder inserted in and connected to the collar, a piston tube extensible from the cylinder, and a threaded rod extensible from the piston tube for abutting an axle; and a restraint assembly comprising a cap covers the cylinder and inserted in the synchronizer and a restraint abuts against the cap and movable engaged with the threaded rod, wherein a hydraulic pressure in the cylinder is increased, causing the piston tube to be extended from the cylinder, the restraint assembly to drive the synchronizer opens the claws; the hydraulic pressure in the cylinder is reduced, causing the piston tube to be retracted into the cylinder, the synchronizer closes the claws so that the claws are engaged with an annular element; and the restraint is moved away from the cap, the threaded rod abuts against the axle, the hydraulic pressure in the cylinder increases, the piston tube and the threaded rod extend from the cylinder, and the axle is pushed by the threaded rod and separated from the annular element.

2. The puller according to claim 1, wherein each of the pivotal connectors comprises two lugs, wherein each of the slots is located between the lugs of a corresponding one of the pivotal connectors, wherein each of the claws is located between and pivotally connected to the lugs of a corresponding one of the pivotal connectors.

3. The puller according to claim 2, wherein each of the lugs comprises an aperture, wherein each of the claws comprises an aperture for receiving a pivot extending throughout the aperture of a corresponding one of the lugs.

4. The puller according to claim 1, wherein each of the slots comprises a closing limit for limiting closing of a corresponding one of the claws and an opening limit for limiting opening of a corresponding one of the claws.

5. The puller according to claim 4, wherein the closing limit extends away from the opening limit of each of the slots as they extend to an internal face of the collar from an external of the collar to allow the claws to pivot throughout a range.

6. The puller according to claim 1, further comprising a first disc connected to the collar and a second disc connected to the synchronizer, wherein the first and second discs are pushed toward each other to move the collar toward the synchronizer.

7. The puller according to claim 6, further comprising at least one screw for interconnecting the first and second discs.

8. The puller according to claim 7, wherein the first disc comprises at least one aperture, wherein the second disc comprises at least one screw hole, wherein the screw is inserted in the screw hole of the second disc via the aperture of the first disc to keep the first and second discs together and allow the first and second discs to move relative to each other.

9. The puller according to claim 1, wherein the receiving portion of the synchronizer comprises bores for receiving the protuberances of the claw.

10. The puller according to claim 1, further comprising a spring located between the synchronizer and the collar so that the spring tends to push the synchronizer away from the collar, thereby closing the claws.

11. The puller according to claim 10, wherein the spring is a compression spring.

12. The puller according to claim 1, wherein the cylinder and the piston tube together form a hydraulic device.

13. The puller according to claim 1, wherein the piston tube and the threaded rod together form a hydraulic device.

14. The puller according to claim 1, wherein the piston tube comprises a thread formed on an internal face, wherein the threaded rod engaged with the thread of the piston tube.

15. The puller according to claim 1, wherein the cap comprising a first end in contact with the synchronizer and a second end opposite to the first end, wherein the threaded rod extends throughout the cap; the restraint movably connected to the threaded rod between a restraining position and a releasing position, wherein the restraint pushes the collar that in turn pushes the synchronizer toward the collar to open the claws when the restraint is in the restraining position, wherein the restraint allows the threaded rod to extend from the piston tube without pushing the cap when the restraint is in the releasing position.

16. The puller according to claim 1, further comprising an extensive element coaxially connected with the abutting assembly.

* * * * *